(12) United States Patent
Ishida

(10) Patent No.: US 9,371,062 B2
(45) Date of Patent: Jun. 21, 2016

(54) BRAKE DEVICE

(71) Applicant: ADVICS CO., LTD., Kariya-shi (JP)

(72) Inventor: Satoshi Ishida, Chiryu (JP)

(73) Assignee: ADVICS CO., LTD., Kariya-Shi, Aichi-Ken (JP)

(*) Notice: Subject to any disclaimer, the term of this patent is extended or adjusted under 35 U.S.C. 154(b) by 0 days.

(21) Appl. No.: 14/334,272

(22) Filed: Jul. 17, 2014

(65) Prior Publication Data

US 2014/0327296 A1 Nov. 6, 2014

Related U.S. Application Data

(62) Division of application No. 13/076,902, filed on Mar. 31, 2011, now Pat. No. 8,801,112.

(30) Foreign Application Priority Data

May 20, 2010 (JP) .................................. 2010-116279

(51) Int. Cl.
*B60T 13/16* (2006.01)
*B60T 7/04* (2006.01)
(Continued)

(52) U.S. Cl.
CPC .............. *B60T 13/161* (2013.01); *B60T 7/042* (2013.01); *B60T 8/4077* (2013.01); *B60T 13/145* (2013.01); *B60T 13/58* (2013.01); *B60T 13/686* (2013.01); *B60T 13/745* (2013.01)

(58) Field of Classification Search
CPC ........ B60T 13/161; B60T 3/58; B60T 13/686
See application file for complete search history.

(56) References Cited

U.S. PATENT DOCUMENTS 5,951,115 A 9/1999 Sakai et al.
8,061,786 B2 11/2011 Drumm et al.
(Continued)

FOREIGN PATENT DOCUMENTS

JP 10-44953 A 2/1998
JP 2007-182122 A 7/2007
(Continued)

OTHER PUBLICATIONS

Japanese Office Action (Notification of Reasons for Refusal) dated Jul. 10, 2012, issued in corresponding Japanese Patent Application No. 2010-116279, and English language translation of Office Action. (6 pages).
(Continued)

*Primary Examiner* — Xuan Lan Nguyen
(74) *Attorney, Agent, or Firm* — Buchanan Ingersoll & Rooney PC

(57) ABSTRACT

A brake device includes: a mechanical pressure regulating part having a high-pressure port, a low-pressure port, a pilot pressure input port, and an output port which outputs fluid pressure corresponding to the pressure supplied to the pilot pressure input port by fluid pressures supplied to both of the high- and low-pressure ports, to a chamber for a master piston; a high-pressure source connected to the high-pressure port and the pilot pressure input port; a low-pressure source connected to the low-pressure port and the pilot pressure input port; and an electrically-operated pilot pressure generating part which includes control valves for controlling flows of the brake fluid between the high-pressure source and the pilot pressure input port, and between the low-pressure source and the pilot pressure input port, respectively, and which outputs desired fluid pressure to the pilot pressure input port by controlling flow of the brake fluid with control valves.

3 Claims, 12 Drawing Sheets

(51) Int. Cl.
*B60T 8/40* (2006.01)
*B60T 13/14* (2006.01)
*B60T 13/74* (2006.01)
*B60T 13/58* (2006.01)
*B60T 13/68* (2006.01)

(56) References Cited

U.S. PATENT DOCUMENTS

| | | |
|---|---|---|
| 8,342,615 B2 | 1/2013 | Drumm |
| 2006/0220451 A1 | 10/2006 | Drumm |
| 2008/0257670 A1 | 10/2008 | Drumm et al. |

FOREIGN PATENT DOCUMENTS

| | | |
|---|---|---|
| JP | 2009-507714 A | 2/2009 |
| JP | 2009-513411 A | 4/2009 |

OTHER PUBLICATIONS

Japanese Office Action issued on Aug. 6, 2013 by the Japanese Patent Office in corresponding related Japanese Patent Application No. 2012-198707, and English language translation of Office Action. (5 pages).

BRAKE DEVICE

CROSS REFERENCE TO RELATED APPLICATIONS

This application is a divisional of U.S. application Ser. No. 13/076,902 filed on Mar. 31, 2011, which is based on and claims priority under 35 U.S.C. §119 to Japanese Patent Application 2010-116279, filed on May 20, 2010, the entire content of which is incorporated herein by reference.

BACKGROUND

1. Field of the Invention

The present invention relates to a brake device.

2. Description of Related Art

JP-A No. 2007-182122 describes one type of brake devices. As shown in FIG. 1 of JP-A No. 2007-182122, the brake device has a driving fluid pressure chamber (external fluid pressure chamber 90p) that drives a master piston (rear master piston 62) and a pressure booster 90 that is connected to the driving fluid pressure chamber. The pressure booster 90 has a fluid pressure source 90a and a fluid pressure controller 90b, which are controlled by an electronic controller 13. The fluid pressure controller 90b has proportional solenoid valves 96a, 96b of a normally close type for pressure boost that are provided in parallel to each other on a fluid passage connected to a boost pressure port 16P of a master cylinder 60 from the fluid pressure source 90a, a proportional solenoid valve 97 of a normally open type for pressure reduction that is provided on a fluid passage connected to a pump reservoir 91 of the fluid pressure source 90a from the boost pressure port 16P, and a proportional solenoid valve pressure gauge 95b that monitors pressure of the boost pressure port 16P.

According to the above-described brake device, a brake fluid is supplied from the fluid pressure source 90a to the external fluid pressure chamber 90p through the proportional solenoid valves 96a, 96b of a normally close type for pressure boost. However, in general, flow rates per unit time of the proportional solenoid valves are relatively low. Accordingly, when high braking force is abruptly required in braking a vehicle, a supply amount of the brake fluid for driving the master piston becomes smaller than a desired amount, so that the sufficient braking force may not be provided in good responsiveness to the braking. In response, it can be considered to make a configuration of increasing the flow rates of the proportional solenoid valves or increase the number of proportional solenoid valves to be provided. However, in this case, the brake device would be enlarged and the cost would be increased.

SUMMARY

The present invention has been made to solve the above problems, and it is an object of the present invention to provide a brake device capable of providing sufficient braking force in good responsiveness to sudden braking without causing the enlargement of the device and the increase of cost.

In order achieve the object, there is provided a brake device which comprises a mechanical pressure regulating part including: a high-pressure port, to which fluid pressure of high pressure is supplied; a low-pressure port, to which fluid pressure of lower pressure than the fluid pressure to be supplied to the high-pressure port is supplied; a pilot pressure input port, to which pilot fluid pressure is supplied; and an output port which outputs fluid pressure corresponding to the pressure supplied to the pilot pressure input port by the fluid pressures supplied to both of the high-pressure port and the low-pressure port, to a driving fluid pressure chamber which drives a master piston; a high-pressure source which is connected to the high-pressure port and the pilot pressure input port, and which accumulates fluid pressure of a brake fluid pumped by an electric pump; a low-pressure source which is connected to the low-pressure port and the pilot pressure input port, and which supplies lower pressure than the high-pressure source; and an electrically-operated pilot pressure generating part which includes a pressure boost control valve for controlling flow of the brake fluid between the high-pressure source and the pilot pressure input port, and a pressure reduction control valve for controlling flow of the brake fluid between the low-pressure source and the pilot pressure input port, and which outputs desired fluid pressure to the pilot pressure input port by controlling the flow of the brake fluid with the pressure boost control valve and the pressure reduction control valve.

According to the brake device as described above, the desired pilot fluid pressure is generated in correspondence to an operating amount of the brake operating member or vehicle state by controlling the pressure boost control valve and the pressure reduction control valve of the electrically-operated pilot pressure generating part and is then input into the pilot pressure input port of the mechanical pressure regulating part. Thereby, the fluid pressure, which corresponds to the output fluid pressure of the electrically-operated pilot pressure generating part applied to the pilot pressure input port, is output from the output port of the mechanical pressure regulating part. Like this, the pressure boost control valve and the pressure reduction control valve having the relatively low flow rate per unit time are used to generate the pilot fluid pressure, which can sufficiently exhibit a function even when a flow rate thereof is low, thereby controlling the mechanical pressure regulating part that can output the relatively high flow rate (per unit time). As a result, it is possible to provide a brake device capable of providing sufficient braking force in good responsiveness to sudden braking without causing the enlargement of the device and the increase of cost.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

(1) First Illustrative Embodiment

Figure 1:
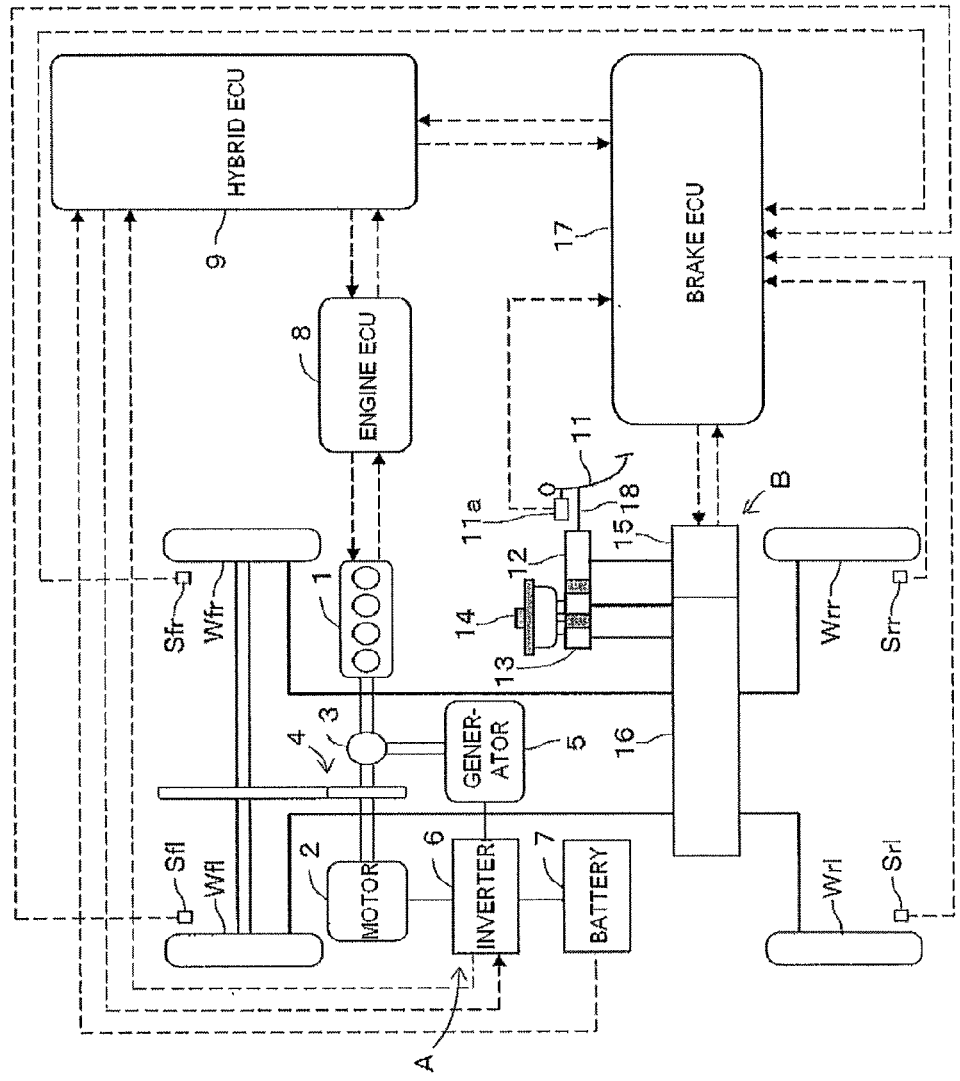
FIG. 1 is an outline view showing a system having a brake device according to a first illustrative embodiment of the present invention.
Figure 2:
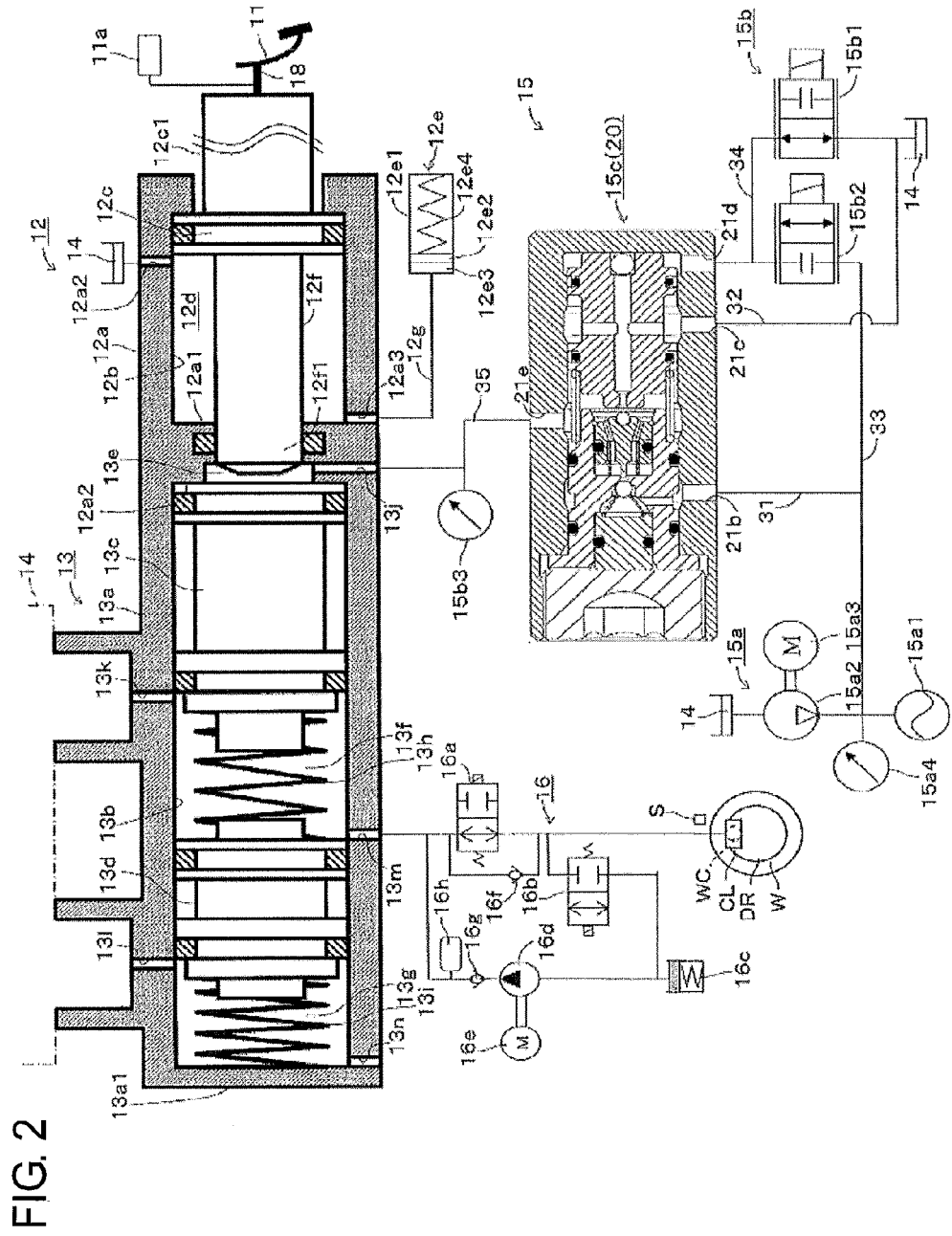
FIG. 2 is an outline view showing the brake device shown in FIG. 1.
Figure 3:
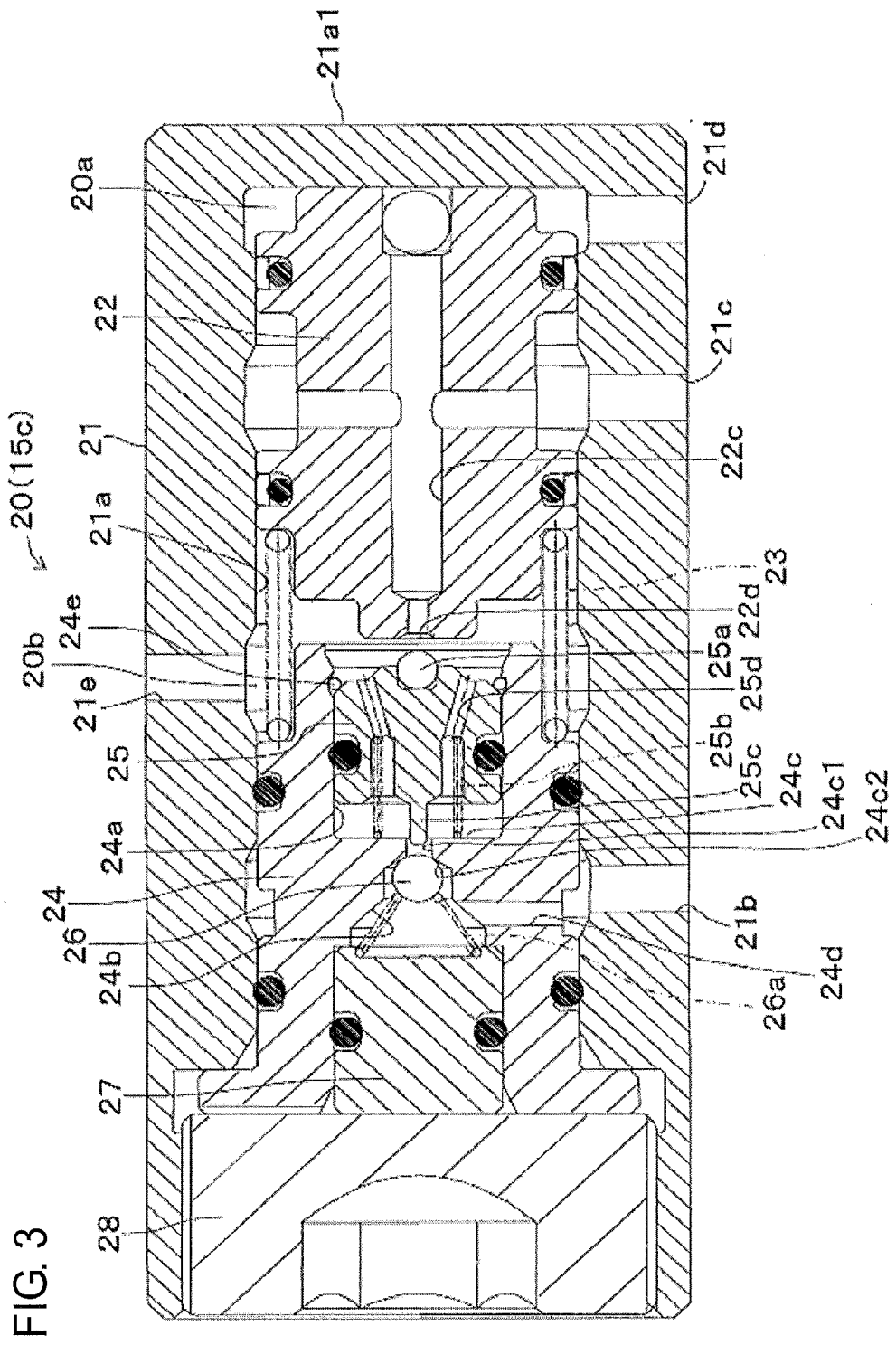
FIG. 3 is a sectional view showing a regulator shown in FIG. 2, showing a state where pilot pressure is not applied.

Hereinafter, a first illustrative embodiment where a brake device is applied to a hybrid vehicle will be described with reference to the drawings. FIG. 1 is an outline view showing a configuration of the hybrid vehicle, FIG. 2 is an outline view showing a configuration of the brake device and FIG. 3 is a sectional view showing a regulator that is a mechanical pressure regulating part.

As shown in FIG. 1, the hybrid vehicle is a vehicle that drives driving wheels, for example, left and right front wheels Wfl, Wfr by a hybrid system. The hybrid system has a power train that combines and uses two types of power sources, i.e., an engine 1 and a motor 2. In the first illustrative embodiment, the system is a parallel hybrid system that directly drives the wheels from the engine 1 and the motor 2. In the meantime, there is a series hybrid system in which the wheels are driven by the motor 2 and the engine 1 serves as a power supplying source to the motor 2.

The hybrid vehicle having the parallel hybrid system mounted thereon has the engine 1 and the motor 2. A driving force of the engine 1 is transmitted to driving wheels (left and right front wheels Wfl, Wfr, in the first illustrative embodiment) through a power dividing mechanism 3 and a power transmission mechanism 4 and a driving force of the motor 2 is transmitted to the driving wheels through the power transmission mechanism 4. The power dividing mechanism 3 appropriately divides the driving force of the engine 1 into a vehicle driving force and a generator driving force. The power transmission mechanism 4 appropriately integrates and transmits the driving forces of the engine 1 and the motor 2 in response to traveling conditions. The power transmission mechanism 4 adjust a ratio of the driving forces of the engine 1 and the motor 2 to be transmitted within a range of 0:100 to 100:0. The power transmission mechanism 4 has a shift transmission function.

The motor 2 increases the driving force by assisting the output of the engine 1 and charges a battery 7 by performing generation of electricity in braking the vehicle. A generator 5 generates electricity by the output of the engine 1 and has a starter function in starting the engine. The motor 2 and the generator 5 are electrically connected to an inverter 6, respectively. The inverter 6 is electrically connected to the battery 7 that is a direct current power supply, and converts alternating current voltages input from the motor 2 and the generator 5 into a direct current voltage and supplies the direct current voltage to the battery 7 or converts a direct current voltage from the battery 7 into an alternating current voltage and outputs the alternating current voltage to the motor 2 and the generator 5.

In the first illustrative embodiment, the motor 2, the inverter 6 and the battery 7 configure a regenerative brake device A. The regenerative brake device A generates a regenerative braking force to any of the respective wheels Wfl, Wfr, Mrl, Wrr (left and right front wheels Wfl, Wfr that are driven by the motor 2 serving as a driving source, in the first illustrative embodiment), based on a brake operating state detected by a pedal stroke sensor 11a (or pressure sensor P).

The engine 1 is controlled by an engine ECU (Electronic Control Unit) 8. The engine ECU 8 outputs a degree-of-opening command to an electronic control throttle in response to an engine output required value from a hybrid ECU 9, which will be described later, thereby adjusting the number of revolutions of the engine 1. The hybrid ECU 9 is connected in communication with the inverter 6. The hybrid ECU 9 calculates necessary engine output, electric motor torque and generator torque from a degree of opening of an accelerator and a shift position (which is calculated from a shift position signal input from a shift position sensor (not shown)), outputs the calculated engine output required value to the engine ECU 8 to control the driving force of the engine 1 and controls the motor 2 and the generator 5 through the inverter 6 in response to the calculated electric motor torque required value and generator torque required value. Also, the hybrid ECU 9 is connected with the battery 7 and monitors a charging state, a charged current and the like of the battery 7. In addition, the hybrid ECU 9 is connected to an accelerator degree-of-opening sensor (not shown) that is assembled to an accelerator pedal (not shown) and detects a degree of opening of a vehicle accelerator and is input with an accelerator degree-of-opening signal from the accelerator degree-of-opening sensor.

In addition, a brake ECU 17 is connected in communication with the hybrid ECU 9 and cooperatively controls regenerative braking and hydraulic braking by the motor 2 so that a total braking force of the vehicle is equivalent to that of a vehicle having a hydraulic brake only. Specifically, the brake ECU 17 outputs a regeneration required value, which the regenerative brake device should bear from the total braking force, to the hybrid ECU 9, as a target value of the regenerative brake device, i.e., a target regenerative braking force, in response to the braking request of a driver, i.e., braking operation state. Based on the input regeneration required value (target regenerative braking force), the hybrid ECU 9 calculates an actual regenerative execution value that is enabled to actually operate as a regenerative brake while considering vehicle speed, battery charging state and the like, controls the motor 2 through the inverter 6 so that the motor generates a regenerative braking force corresponding to the actual regenerative execution value, and outputs the calculated actual regenerative execution value to the brake ECU 17.

In addition, the brake ECU 17 stores a fluid pressure braking force, which is applied to the wheels W when braking fluid pressure is supplied to a wheel cylinder WC, in a memory in a form of a map, table or calculation equation. Also, the brake ECU 17 stores the target regenerative braking force, which is applied to the wheels W in response to a brake operating state that is a stroke of the brake pedal (or master cylinder pressure), in the memory in a form of a map, table or calculation equation.

Additionally, the hybrid vehicle has a brake device B that directly applies the fluid pressure braking force to the respective wheels Wfl, Wfr, Wrl, Wrr and thus brakes the vehicle. As shown in FIGS. 1 and 2, the brake device B has a brake pedal 11 that is a brake operating member, a stroke simulator part 12, a master cylinder 13, a reservoir tank 14, a master piston driving fluid pressure regulating device 15 (hereinafter, referred to as driving fluid pressure regulating device 15), a braking fluid pressure regulating device 16, the brake ECU 17 and a wheel cylinder WC.

The wheel cylinder WC regulates rotations of the wheels W, respectively and is provided in a caliper CL. When pressure of the brake fluid (brake fluid pressure) is supplied to the wheel cylinder WC from the master cylinder 13, each piston (not shown) of the wheel cylinder WC presses a pair of brake pads (frictional members, not shown) to sandwich a disk rotor DR, which is a rotational member integrally rotating with the wheels W, thereby regulating rotation of the disk rotor. Meanwhile, in this illustrative embodiment, a hydraulic path of only one of the left and right front wheels is shown and the other hydraulic path having the same configuration is omitted. Further, in this illustrative embodiment, a disc-type brake is adopted. However, a drum-type brake may be adopted. The wheel W is one of the left and right front and rear wheels Wfl, Wfr, Wrl, Wrr.

A pedal stroke sensor 11a, which detects a brake pedal stroke (operating amount) that is a brake operating state resulting from the pedaling of the brake pedal 11, is provided adjacent to the brake pedal 11. The pedal stroke sensor 11a is connected to the brake ECU 17 and a detection signal thereof is output to the brake ECU 17.

The brake pedal 11 is connected to a stroke simulator part 12 through a push rod 18. The stroke simulator part 12 has a body 12a, a hole 12b that is formed in the body 12a, a piston 12c that can slide liquid-tightly in the hole 12b, a fluid pressure chamber 12d that is formed by the body 12a and the piston 12c and a stroke simulator 12e that communicates with the fluid pressure chamber 12d.

The body 12a is integrally connected to a body 13a of the master cylinder 13. A connection part 12c1 to which the push rod 18 is connected is formed at one end side of a sliding direction (axial direction) of the piston 12c. A rod 12f is integrally provided at the other end side of the sliding direction of the piston 12c, which is opposite to the push rod 18. The other end portion 12f1 of the rod 12f, which is opposite to the push rod 18, is penetrated into a partition wall 12a1, which partitions the fluid pressure chamber 12d of the stroke simulator part 12 and a driving fluid pressure chamber 13e of the master cylinder 13, and is supported liquid-tightly. The partition wall 12a1 forms a part of the body 12a.

The fluid pressure chamber 12d communicates with the reservoir tank 14 through a first input-output port 12a2 and communicates with the stroke simulator 12e through an oil passage 12g connected to a second input-output port 12a3. The stroke simulator 12e is well known and generates a stroke (reaction force) having a magnitude corresponding to an operating state of the brake pedal 11 to the brake pedal 11. The stroke simulator 12e has a piston 12e2 that slides liquid-tightly in a housing 12e1, a fluid pressure chamber 12e3 that is formed between the housing 12e1 and the piston 12e2 and a spring 12e4 that presses the piston 12e2 in a direction of reducing a volume of the fluid pressure chamber 12e3.

The master cylinder 13 is a device that forms and supplies fluid pressure (master cylinder pressure) to the wheel cylinder WC in correspondence to an operating force of the brake pedal 11, which is a brake operating member, applied by a driver, and generates a fluid pressure braking force to the wheel W by the fluid pressure.

The master cylinder 13 is a master cylinder of a tandem-type and has the body 13a. The body 13a is formed with a cylinder hole 13b. In the cylinder hole 13b, first and second pistons 13c, 13d are arranged in line so that they can slide liquid-tightly.

The driving fluid pressure chamber 13e for driving the first and second pistons 13c, 13d is formed between the first piston 13c and the partition wall 12a1. The other end portion 12f1 of the rod 12f reciprocatably faces the driving fluid pressure chamber 13e. The partition wall 12a1 is formed with a step portion 12a2 and one end of the first piston 13c is contacted to the step portion 12a2. The driving fluid pressure chamber 13e is adapted to secure a volume even when the first piston 13c is contacted to the step portion 12a2.

A first fluid pressure chamber 13f that forms a master cylinder pressure is formed between the first piston 13c and the second piston 13d and a second fluid pressure chamber 13g that forms a master cylinder pressure is formed between the second piston 13d and a bottom wall 13a1. In the first fluid pressure chamber 13f, a spring 13h is provided which is interposed between the first piston 13c and the second piston 13d and presses the pistons in a direction of enlarging the first fluid pressure chamber 13f. In the second fluid pressure chamber 13g, a spring 13i is provided which is interposed between the second piston 13d and the bottom wall 13a1 and presses the piston in a direction of enlarging the second fluid pressure chamber 13g.

When fluid pressure is not supplied to the driving fluid pressure chamber 13e (for example, when the brake pedal 11 is not pedaled), the second piston 13d is pressed by the spring 13i and is thus located at a predetermined position and the first piston 13c is pressed by the spring 13h and is thus located at a predetermined position (refer to FIG. 2). The predetermined position of the first piston 13c is a position where one end of the first piston 13c is contacted to the step portion 12a2 and is a position just before the other end of the first piston 13c closes a port 13k. The predetermined position of the second piston 13d is a position just before the other end of the second piston 13d closes a port 13l.

The body 13a of the master cylinder 13 is formed with a port 13j for communicating the driving fluid pressure chamber 13e and a regulator 15c, a port 13k for communicating the first fluid pressure chamber 13f and the reservoir tank 14, a port 13l for communicating the second fluid pressure chamber 13g and the reservoir tank 14, a port 13m for communicating the first fluid pressure chamber 13f and the wheel cylinder WC and a port 13n for communicating the second fluid pressure chamber 13g and the other wheel cylinder (not shown).

The driving fluid pressure regulating device 15 is to regulate the pressure of the driving fluid pressure chamber 13e of the master cylinder 13 by fluid pressures of both pressure sources, i.e., high-pressure source and low-pressure source and has a pressure supply device 15a, an electrically-operated pressure regulating part 15b (electrically-operated pilot pressure generating part) and the regulator 15c (mechanical pressure regulating part). The driving fluid pressure regulating device 15 forms fluid pressure (regulator pressure) corresponding to pressure, which is applied to a pilot pressure input port 21d by the fluid pressures applied to both ports, i.e., high-pressure port 21b and low-pressure port 21c, and outputs the same to the driving fluid pressure chamber 13e of the master cylinder 13.

The pressure supply device 15a has the reservoir tank 14, which is a low-pressure source, an accumulator 15a1, which is a high-pressure source, a pump 15a2, which suctions the brake fluid of the reservoir tank 14 and pumps the same to the accumulator 15a1, and an electric motor 15a3 that drives the pump 15a2. The reservoir tank 14 is opened to the atmosphere and the fluid pressure of the reservoir tank 14 is same as the atmospheric pressure. The low-pressure source supplies a lower pressure than the high-pressure source.

Although the reservoir tank 14 is commonly used as the low-pressure source of the pressure supply device 15a, a separate reservoir tank may be provided. In the meantime, the pressure supply device 15a has a pressure sensor 15a4 that detects pressure of the brake fluid supplied from the accumulator 15a1 and outputs a detection signal thereof to the brake ECU 17.

The electrically-operated pressure regulating part 15b includes a pressure reduction control valve 15b1 of a normally open type that controls the flow of the brake fluid between the reservoir tank 14 and the pilot pressure input port 21d, a pressure boost control valve 15b2 of a normally close type that controls the flow of the brake fluid between the accumulator 15a1 and the pilot pressure input port 21d, and a pressure sensor 15b3 that detects the fluid pressure of the driving fluid pressure chamber 13e. The pressure reduction control valve 15b1 and the pressure boost control valve 15b2 are solenoid valves that are operated in response to commands from the brake ECU 17. The pressure sensor 15b3 outputs a detection signal to the brake ECU 17.

While monitoring the detection value by the pressure sensor 15b3, the electrically-operated pressure regulating part 15b can supply desired pilot fluid pressure, which corresponds to the stroke amount of the brake pedal 11 detected by the pedal stroke sensor 11a or vehicle state, to a pilot fluid pressure chamber 20a by regulating the fluid pressure, which is supplied to the pilot pressure input port 21d from the accumulator 15a1, with the pressure boost control valve 15b2, and regulating the discharging of the brake fluid to the reservoir tank 14 (fluid pressure discharged from the pilot pressure input port 21d to the reservoir tank 14) with the pressure reduction control valve 15b1.

The regulator 15c is configured by a regulator 20 as shown in FIG. 3. A housing 21 (cylinder) of the regulator 20 is formed with a cylinder hole 21a, the high-pressure port 21b, the low-pressure port 21c, the pilot pressure input port 21d and an output port 21e. As shown in FIG. 2, the high-pressure port 21b is directly connected to the accumulator 15a1 through a fluid pressure oil passage 31. The low-pressure port 21c is directly connected to the reservoir tank 14 through a fluid pressure oil passage 32. Here, the configuration "directly connected" means that a solenoid valve or check valve is not provided on the fluid pressure oil passage.

The pilot pressure input port 21d is connected with a fluid pressure oil passage 33, which is branched in the middle of the fluid pressure oil passage 31, and is connected to the accumulator 15a1 through the fluid pressure oil passage 33 and the fluid pressure oil passage 31. In addition, a fluid pressure oil passage 34 that is branched in the middle of the fluid pressure oil passage 32 is connected to the fluid pressure oil passage 33 and the pilot pressure input port 21d is connected to the reservoir tank 14 through the fluid pressure oil passage 33, the fluid pressure oil passage 34 and the fluid pressure oil passage 32. The pressure boost control valve 15b2 is provided on the fluid pressure oil passage 33. In addition, the pressure reduction control valve 15b1 is provided on the fluid pressure oil passage 34.

The output port 21e is connected to the driving fluid pressure chamber 13e of the master cylinder 13 through a fluid pressure oil passage 35.

A pressure regulating piston 22 is provided in the cylinder hole 21a such that it can slide liquid-tightly. The pressure regulating piston 22 has a straight line shape and the pressure-receiving areas of both end surfaces thereof are the substantially same. The pilot fluid pressure chamber 20a is formed between one side end (right side end in FIG. 3) of the pressure regulating piston 22 and a bottom wall 21a1 of the cylinder hole 21a and a pressure regulating chamber 20b is formed at the other side end (left side end in FIG. 3) of the pressure regulating piston 22. The pilot fluid pressure chamber 20a communicates with the pilot pressure input port 21d, and the pressure regulating chamber 20b communicates with the output port 21e. The pressure regulating piston 22 is formed with a communication passage 22c that communicates with the low-pressure port 21c. The pressure regulating chamber 20b is provided with a spring 23, so that the pressure regulating piston 22 is pressed in a direction of enlarging a volume of the pressure regulating chamber 20b.

When the fluid pressure is not applied to the pilot fluid pressure chamber 20a (for example, when the brake pedal 11 is not operated), the pressure regulating piston 22 is pressed in the right direction of FIG. 3 by the pressing force of the spring 23 and the right side end of the pressure regulating piston 22 is contacted to the bottom wall 21a1 and is thus position-determined. At this time, since a pressure reduction valve that will be described later is opened, the output port 21e communicates with the low-pressure port 21c through the pressure regulating chamber 20b and the communication passage 22c.

A cylinder member 24 having a partition part 24c that partitions two holes 24a, 24b is fixed in the cylinder hole 21a. The hole 24a is opposed to the pressure regulating chamber 20b, and a valve body 25 is slidably provided in the hole 24a. A ball 25a is fixed to an end portion of the valve body 25 facing the pressure regulating chamber 20b. The ball 25a is detachably provided with respect to a valve seat 22d that is formed at an end portion of the pressure regulating piston 22 facing the pressure regulating chamber 20b. The ball 25a is seated on the valve seat 22d when the pressure regulating piston 22 is slid by a predetermined distance in a direction of reducing a volume of the pressure regulating chamber 20b. The ball 25a and the valve seat 22d configure a pressure reduction valve and allow or cut off communication between the pressure regulating chamber 20b and the communication passage 22c, thereby reducing the fluid pressure (regulator fluid pressure) in the pressure regulating chamber 20b. The valve body 25 is pressed to the valve seat 22d by a spring 25b. The other end portion of the valve body 25, which is opposite to the pressure regulating chamber 20b, is integrally provided with a protrusion 25c having a small diameter. In addition, the valve body 25 is formed with a communication passage 25d that communicates a space formed by the hole 24a, the partition part 24c and the valve body 25 and the pressure regulating chamber 20b.

A ball-shaped valve body 26 is movably provided in the hole 24b of the cylinder member 24 and is detachably provided with regard to a valve seat 24c2 of a valve hole 24c1 that is formed in the partition part 24c. The valve hole 24c1 is configured so that the protrusion 25c of the valve body 25 can advance and retreat, and an inner diameter of the valve hole 24c1 is formed to be larger than an outer diameter of the protrusion 25c. The valve body 26 is pressed toward the valve seat 24c2 by a spring 26a. In a normal state, the valve body 26 is pressed and thus seated on the valve seat 24c2. When the valve body 25 slides in the left direction of FIG. 3, the valve body 26 is pressed by the protrusion 25c of the valve body 25 and is thus detached from the valve seat 24c2. The cylinder member 24 is formed with a communication passage 24d that communicates the hole 24b with the high-pressure port 21b. The valve body 26, the valve seat 24c2 and the spring 26a configure a pressure boost valve, which cooperates with the pressure reduction valve to allow or cut off communicate between the pressure regulating chamber 20b and the communication passage 24d, thereby boosting the fluid pressure (regulator fluid pressure) in the pressure regulating chamber 20b. In the meantime, the hole 24b is plugged by a stopper 27 and the cylinder member 24 is fixed by a nut 28.

In the meantime, a flow path sectional area in the regulator 20 is set to be larger than those of the control valves 15b1, 15b2.

The operations of the regulator 20 configured as described above will be described with reference to FIG. 3. When the pilot fluid pressure chamber 20a is pressure-boosted and a force (=pressure× pressure-receiving area) applied to one side end of the pressure regulating piston 22 facing the pilot fluid pressure chamber 20a becomes thus greater than a total sum of a force (=pressure× pressure-receiving area) applied to the other side end of the pressure regulating piston 22 facing the pilot fluid pressure chamber 20b and the pressing force by the spring 23, the pressure regulating piston 22 is moved leftwards. In addition, when the pressure regulating piston 22 is moved leftwards, the valve seat 22d is contacted to the ball 25a, so that the pressure reduction valve is closed. Also, when the pressure regulating piston 22 is moved leftwards, the pressure regulating piston 22 is moved against the pressing force of the spring 25b and the valve body 25 is thus moved leftwards. When the valve body 25 is further moved leftwards, the protrusion 25c is contacted to the valve body 26, and the valve body 26 is then moved leftwards against the pressing force of the spring 26a and a valve closing force (=pressure× pressure-receiving area) of the valve body 26, so that the pressure boost valve is opened.

When the pressure boost valve is opened, the fluid pressure of high pressure from the accumulator 15a1 is supplied to the pressure regulating chamber 20b via the high-pressure port 21b, the communication passage 24d, the valve hole 24c1 and the communication passage 25d. When the fluid pressure in the pressure regulating chamber 20b is increased and the force applied to the one side end of the pressure regulating piston 22 becomes thus smaller than the total sum of the force applied to the other side end of the pressure regulating piston 22 and the pressing force of the spring 23, the pressure regulating piston 22 is moved rightwards. Then, the pressure boost valve is closed and the valve body 25 is contacted to a regulating member 24e, so that the pressure reduction valve is opened. Thereby, the pressure regulating chamber 20b is enabled to communicate with the low-pressure port 21c through the communication passage 21c, so that the fluid pressure in the pressure regulating chamber 20b is lowered.

When the fluid pressure in the pressure regulating chamber 20b is lowered and the force applied to the one side end of the pressure regulating piston 22 becomes thus greater than the total sum of the force applied to the other side end of the pressure regulating piston 22 and the pressing force of the spring 23, the pressure regulating piston 22 is again moved leftwards. Like this, as the pressure regulating piston 22 is repeatedly moved leftwards and rightwards, the regulator 20 can output the fluid pressure corresponding to the fluid pressure, which is supplied to the pilot fluid pressure chamber 20a, from the output port 21e by the pressure applied to both of the high-pressure port 21b and the low-pressure port 21c.

As shown in FIG. 2, the braking fluid pressure regulating device 16 has a holding valve 16a, a pressure reduction valve 16b, a reservoir tank 16c, a pump 16d and an electric motor 16e. The holding valve 16a is a solenoid opening and closing valve of a normally open type that is provided between the port 13m of the master cylinder 13 and the wheel cylinder WC and allows or cuts off communication between the master cylinder 13 and the wheel cylinder WC. The holding valve 16a is configured as a two-position valve that can control the master cylinder and the wheel cylinder into the communication state (which is shown) under off-state and the master cylinder and the wheel cylinder into the cut-off state under on-state, in response to commands from the brake ECU 17. A check valve 16f that permits the flow from the wheel cylinder WC to the master cylinder 13 and regulates the flow of a reverse direction thereof is provided in parallel with the holding valve 16a.

The pressure reduction valve 16b is a solenoid opening and closing valve of a normally close type that allows or cuts off communication between the wheel cylinder WC and the reservoir tank 16c. The pressure reduction valve 16b is configured as a two-position valve that can control the wheel cylinder and the reservoir tank into the cut off state (which is shown) under off-state and the wheel cylinder and the reservoir tank into the communication state under on-state, in response to commands from the brake ECU 17.

The reservoir tank 16c stores the brake fluid and communicates with the port 13m of the master cylinder 13. The pump 16d is provided between the reservoir tank 16c and the master cylinder 13. The pump 16d has a suction port that communicates with the reservoir tank 16c and an ejection port that communicates between the master cylinder 13 and the holding valve 16a through a check valve 16g. The check valve 16g is a check valve that permits the flow from the pump 16d to the master cylinder 13 and regulates the flow of a reverse direction thereof. The pump 16d is driven as the electric motor 16e is operated in response to the command from the brake ECU 17. The pump 16d suctions the brake fluid stored in the wheel cylinder WC or brake fluid stored in the reservoir tank 16c and returns the same to the master cylinder 13, under pressure reduction mode of ABS control. In order to alleviate pulsation of the brake fluid ejected from the pump 16d, a damper 16h is provided upstream of the pump 16d.

The braking fluid pressure regulating device 16 has a wheel speed sensor 16i that is provided adjacent to the wheel W and detects wheel speed of the wheel W. A detection signal indicating the wheel speed detected by the wheel speed sensor 16i is output to the brake ECU 17.

In the braking fluid pressure regulating device 16 configured as described above, the brake ECU 17 performs ABS control (anti lock brake control) of switching the opening and closing of the respective solenoid valves 16a, 16b, based on the master cylinder pressure, the wheel speed and the longitudinal acceleration, and operating the electric motor 16e, as required, to adjust the brake fluid pressure applied to the wheel cylinder WC, i.e., the braking force applied to the wheel W.

According to the above illustrative embodiment, by controlling the pressure boost control valve 15b2 and the pressure reduction control valve 15b1 of the electrically-operated pilot pressure generating part 15b, the desired pilot fluid pressure is generated in correspondence to the operating amount of the brake pedal 11 (brake operating member) or vehicle state and is then input to the pilot pressure input port 21d of the regulator 15c (mechanical pressure regulating part). Thereby, the fluid pressure corresponding to the output fluid pressure of the electrically-operated pilot pressure generating part 15b applied to the pilot pressure input port 21d of the regulator 15c is output from the output port 21e. Like this, the pressure boost control valve 15b2 and the pressure reduction control valve 15b1 having the relatively low flow rate per unit time are used to generate the pilot fluid pressure that can sufficiently exhibit a function even though the flow rate thereof is low, thereby controlling the regulator 15c capable of outputting a relatively high flow rate (per unit time). Accordingly, it is possible to provide a brake device capable of providing sufficient braking force in good responsiveness to sudden braking without causing the enlargement of the device and the increase of cost.

(2) Second Illustrative Embodiment

Figure 4:
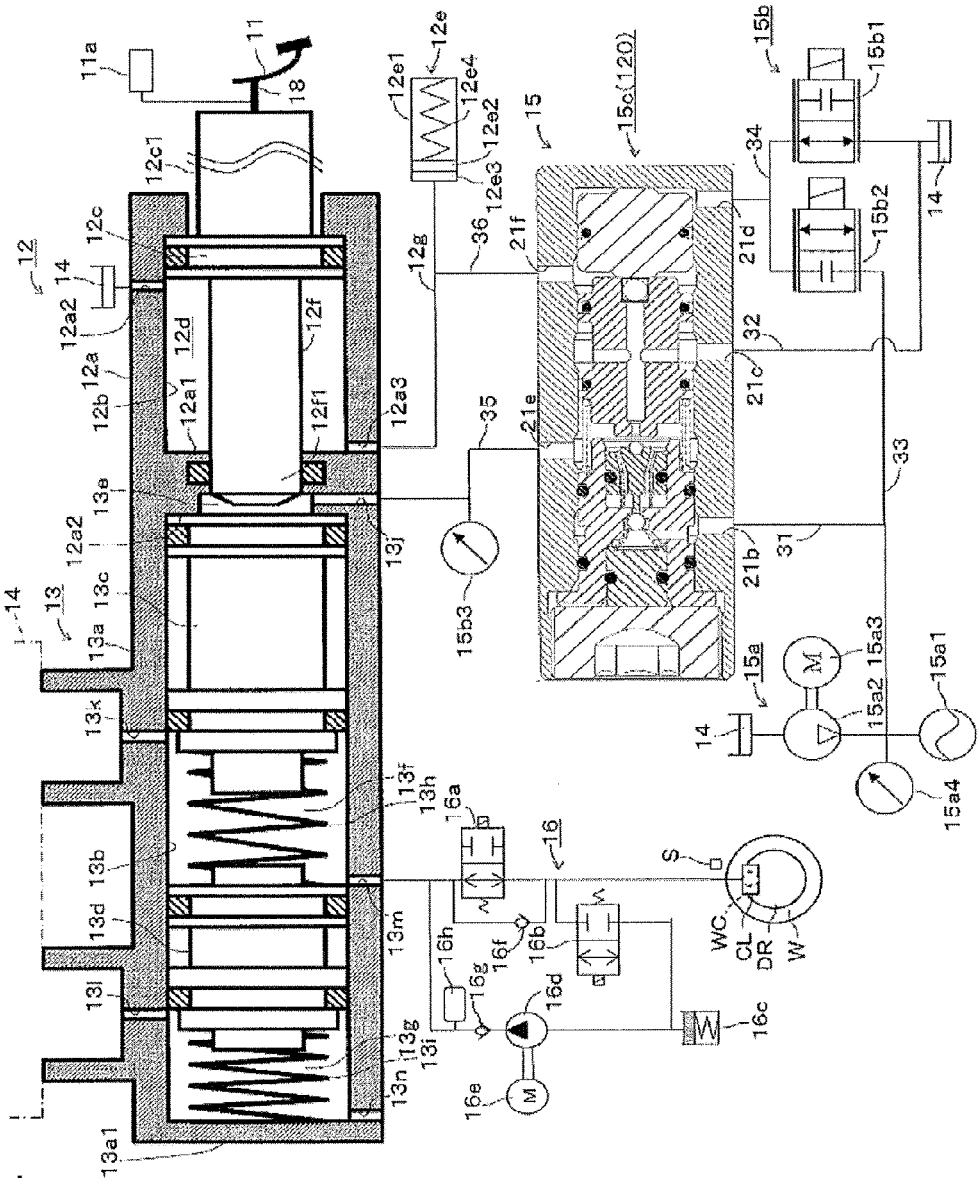
FIG. 4 is an outline view showing a brake device according to a second illustrative embodiment of the present invention.
Figure 5:
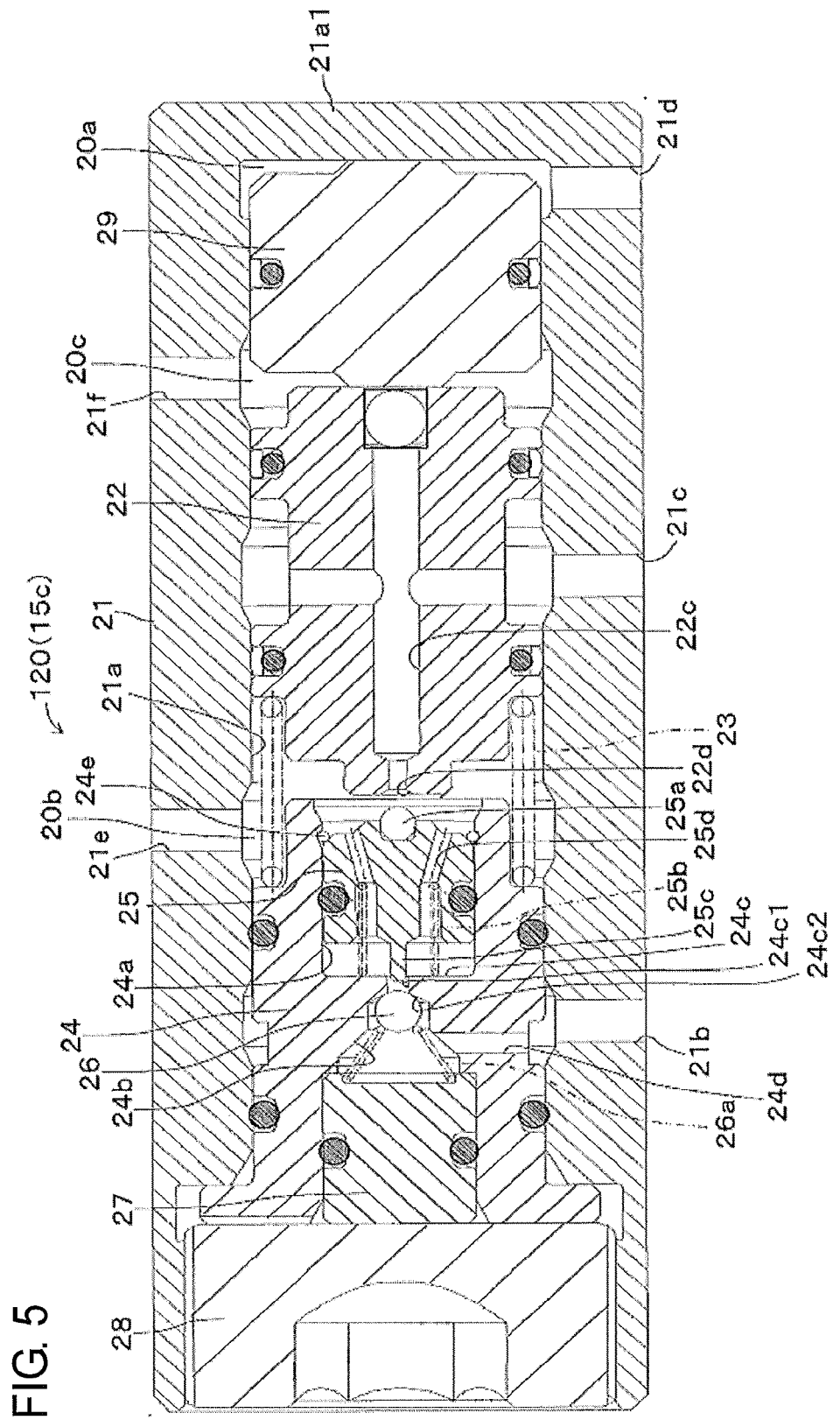
FIG. 5 is a sectional view showing a regulator shown in FIG. 4.

Next, the brake device according to a second illustrative embodiment of the present invention is described with reference to FIGS. 4 and 5. FIG. 4 is an outline view showing a configuration of the brake device B, and FIG. 5 is a sectional view showing a regulator 120. The second illustrative embodiment is different from the first illustrative embodiment, in that the regulator 120 is operated by inputting pilot fluid pressures of two types from separate pilot pressure input ports. The same configurations are indicated with the same reference numerals and the descriptions thereof are omitted.

Specifically, a second pressure regulating piston 29 is provided liquid-tightly and slidably between the pressure regulating piston 22 (first pressure regulating piston) and the bottom wall 21a1. The second pressure regulating piston 29 is a piston that partitions neighboring pilot fluid pressure chambers 20a, 20c of a plurality of pilot fluid pressure chambers 20a, 20c and slides in the cylinder hole 21a. Specifically, the pilot fluid pressure chamber 20a (first pilot fluid pressure chamber) is formed between the second pressure regulating piston 29 and the bottom wall 21a1. The second pilot fluid pressure chamber 20c is formed between the second pressure regulating piston 29 and the first pressure regulating piston 22. The second pilot fluid pressure chamber 20c communicates with a pilot pressure input port 21f. The pilot pressure input port 21f is connected to the oil passage 12g through a fluid pressure oil passage 36.

In other words, the pilot pressure input port 21d is connected with the reservoir tank 14 (low-pressure source) through the pressure reduction control valve 15b1 and with the accumulator 15a1 (high-pressure source) through the pressure boost control valve 15b2. The pilot fluid pressures, which are generated as the pressure reduction control valve 15b1 and the pressure boost control valve 15b2 are operated, are applied to the pilot pressure input port 21d.

In the meantime, the pilot pressure input port 21f different from the pilot pressure input port 21d is connected with the stroke simulator part 12 that is the mechanical pilot pressure generating part to generate the pilot fluid pressure corresponding to the operating amount of the brake pedal 11. The pilot fluid pressure generated in the stroke simulator part 12 is applied to the pilot pressure input port 21f.

That is, the regulator 15c has the plurality of pilot pressure input ports 21d, 21f and outputs the fluid pressure, which corresponds to the highest fluid pressure of the fluid pressures applied to the pilot pressure input ports 21d, 21f, to the output port 21e. Specifically, when the pressure reduction control valve 15b1 and the pressure boost control valve 15b2 are operated without the failure of the electric system, the fluid pressure that is supplied from the pressure reduction control valve 15b1 and the pressure boost control valve 15b2 to the input port 21d is set to have a pressure value higher than the fluid pressure that is supplied from the stroke simulator part 12 to the pilot pressure input port 21f. Thereby, the pedaling force of the brake pedal 11 is increased in a predetermined ratio.

Accordingly, when the pilot fluid pressure is supplied from the pressure reduction control valve 15b1 and the pressure boost control valve 15b2 to the first pilot fluid pressure chamber 20a through the pilot pressure input port 21d, the second and first pressure regulating pistons 29, 22 are pressed against the pressing force of the spring 23. At this time, the first pressure regulating piston 22 is pressed by the resultant force of the force, which is applied to the end surface of the first pressure regulating piston 22 facing the second pilot fluid pressure chamber 20c by the pilot fluid pressure supplied to the second pilot fluid pressure chamber 20c, and the force, which is directly applied from the second pressure regulating piston 22 being contacted. In the meantime, since the pressure-receiving areas of both end surfaces of the second pressure regulating piston 29 are the substantially same, the force that is directly applied from the second pressure regulating piston 22 is the same as the force that the first pressure regulating piston 22 is applied at the end surface facing the first pilot fluid pressure chamber 20a by the pilot fluid pressure supplied to the first pilot fluid pressure chamber 20a. In addition, the pressure-receiving areas of both end surfaces of the second pressure regulating piston 29 are the substantially same and the pressure received at the end surface of the second pressure regulating piston 20 facing the second pilot fluid pressure chamber 20c is smaller than the pressure received at the opposite side thereof. Accordingly, even when the pilot fluid pressure is supplied from the stroke simulator part 12, the second pressure regulating piston 29 is not returned toward the bottom wall 21a1.

Therefore, the regulator 15c forms the regulator pressure corresponding to the pilot fluid pressure supplied to the first and second pilot fluid pressure chambers 20a, 20c and outputs the same to the driving fluid pressure chamber 13e of the master cylinder 13.

In the meantime, when the pressure reduction control valve 15b1 and the pressure boost control valve 15b2 cannot operate due to the failure of the electric system and the like, the pilot fluid pressure is not supplied from the pressure reduction control valve 15b1 and the pressure boost control valve 15b2 to the first pilot fluid pressure chamber 20a through the pilot pressure input port 21d. However, the pilot fluid pressure is supplied from the stroke simulator part 12 to the second pilot fluid pressure chamber 20c through the pilot pressure input port 21f. At this time, the regulator 15c forms the regulator pressure corresponding to the pilot fluid pressure supplied to the second pilot fluid pressure chamber 20c only and outputs the same to the driving fluid pressure chamber 13e of the master cylinder 13.

According to the second illustrative embodiment, the regulator 15c (mechanical pressure regulating part) outputs the fluid pressure, which corresponds to the highest fluid pressure of the fluid pressures applied to the pilot pressure input ports 21d, 21f, to the output port 21e, and the stroke simulator part 12 (mechanical pilot pressure generating part) is connected to the pilot pressure input port 21f that is different from the port 21d of the plurality of pilot pressure input ports 21d, 21f to which the electrically-operated pilot pressure generating part 15b is connected.

Therefore, it is possible not only to apply the output fluid pressure of the electrically-operated pilot pressure generating part 15b to the pilot pressure input port 21d of the regulator 15c but also to apply the output fluid pressure of the separately provided stroke simulator part 12 to the pilot pressure input port 21f of the regulator 15c.

In addition, the pressure boost control valve 15b2 of the electrically-operated pilot pressure generating part 15b is a control valve of a normally close type, the pressure reduction control valve 15b1 of the electrically-operated pilot pressure generating part 15b is a control valve of a normally open type, and the regulator 15c outputs the fluid pressure corresponding to the highest fluid pressure of the fluid pressures applied to the plurality of pilot pressure input ports 21d, 21f.

Accordingly, under off-state resulting from the failure of the electric system, the pressure boost control valve 15b2 of the electrically-operated pilot pressure generating part 15b is closed and the pressure reduction control valve 15b1 thereof is opened, so that the fluid pressure of the low-pressure source 14 is output, and the fluid pressure corresponding to the fluid pressure of the stroke simulator part 12 is output from the output port 21e of the regulator 15c. Like this, even when the electric system fails, the fluid pressure of the stroke simulator part 12 is applied to the pilot pressure input port 21f of the regulator 15c and the fluid pressure corresponding to the applied fluid pressure is applied to the driving fluid pressure chamber 13e, so that it is possible to generate the braking force corresponding to the operating amount of the brake pedal 11 inasmuch as the fluid pressure remains in the accumulator 15a1 (high-pressure source).

In addition, the regulator 15c has the cylinder 21, the plurality of pistons 22, 29 (two pistons in this illustrative embodiment), which slide in the cylinder 21, and the plurality of pilot fluid pressure chambers 20a, 20c, which are formed by the cylinder 21 and the plurality of pistons 22, 29 and communicate with the plurality of pilot pressure input ports 21d, 21f, respectively. The stroke simulator part 12 (mechanical pilot pressure generating part) is connected to the pilot pressure input port 21f that communicates with the pilot fluid pressure chamber 20c that is formed by the piston 22 driven by the output fluid pressure of the stroke simulator part 12. The electrically-operated pilot pressure generating part 15b is connected to the pilot pressure input port 21d that communicates with the pilot fluid pressure chamber 20a, which is a fluid pressure chamber that is formed by the piston 29 driven by the output fluid pressure of the electrically-operated pilot pressure generating part 15b, different from the piston 22 driven by the output fluid pressure of the stroke simulator part 12, and which is different from the pilot fluid pressure chamber 20c that is formed by the piston 22 driven by the output fluid pressure of the stroke simulator part 12. The piston 22 driven by the output fluid pressure of the stroke simulator part 12 is also driven by the pressing force of the piston 29 that is driven by the output fluid pressure of the electrically-operated pilot pressure generating part 15b.

Thereby, it is possible to hold the sliding resistance of the piston 22 small, which is driven by the output fluid pressure of the stroke simulator part 12, and to thus prevent the fixation of the piston 22. Accordingly, it is possible to surely generate the braking force corresponding to the operating amount of the brake pedal 11 even when the electric system fails.

Figure 6:
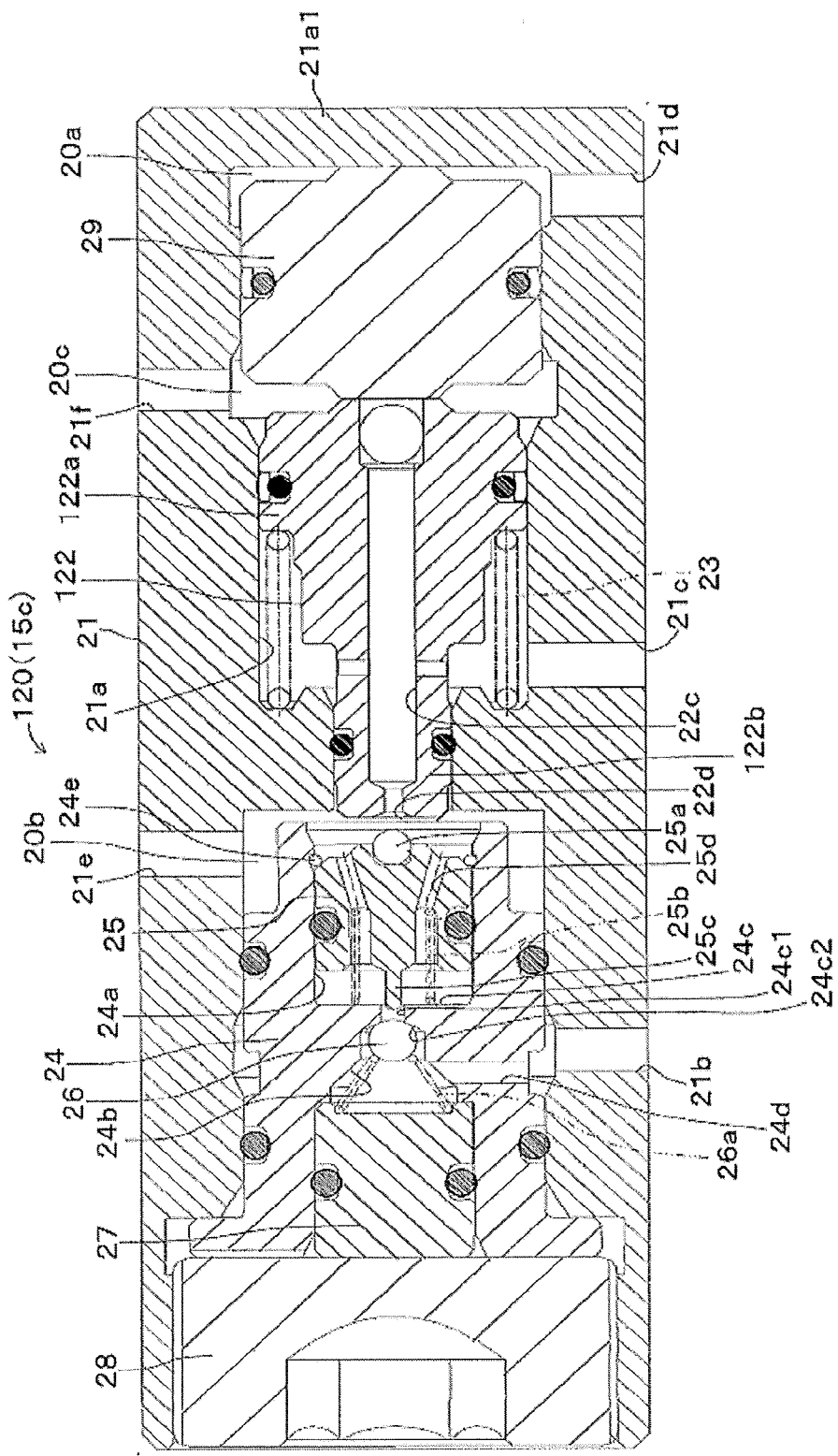
FIG. 6 is a sectional view showing a modified embodiment of a regulator shown in FIG. 4.

Additionally, in the second illustrative embodiment, the first pressure regulating piston 22 having the substantially same pressure-receiving areas on both left and right end surfaces may be replaced with a first pressure regulating piston 122 having different pressure-receiving areas on left and right end surfaces. As shown in FIG. 6, the first pressure regulating piston 122 has a large diameter part 122a and a small diameter part 122b having a diameter smaller than the large diameter part 122a, which are integrally formed. The large diameter part 122a faces the second pilot fluid pressure chamber 20c and the small diameter part 122b faces the pressure regulating chamber 20b. Accordingly, when the pressure reduction control valve 15b1 and the pressure boost control valve 15b2 are not operated due to the failure of the electric system and the like, it is possible to output the regulator pressure of a predetermined ratio (pressure-receiving area ratio) with respect to the fluid pressure that is supplied from the stroke simulator 12 to the second pilot fluid pressure chamber 20c. In other words, the pedaling force of the brake pedal 11 is increased in a predetermined ratio.

In addition, the respective pressure-receiving areas on the end surface of the large diameter part 122a of the first pressure regulating piston 122 and the end surface of the small diameter part 122b are set such that the regulator 15c can output the fluid pressure corresponding to the pressure applied to the pilot pressure input port 21d from the output port 21e by the fluid pressures applied to both the high-pressure port 21b and the low-pressure port 21c.

In the second illustrative embodiment, two pistons are provided as the plurality of pistons 22, 29 that slides in the cylinder 21. However, three or more pistons may be provided.

(3) Third Illustrative Embodiment

Figure 7:
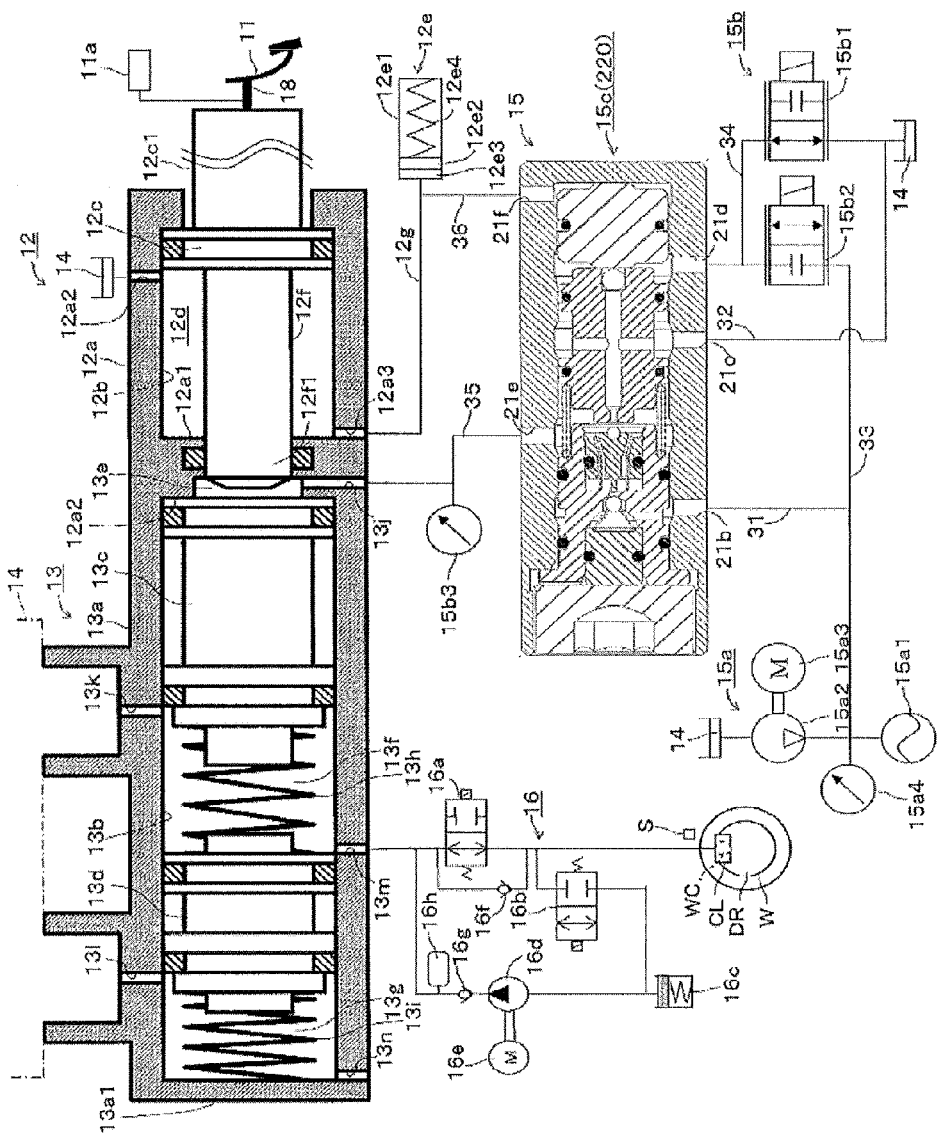
FIG. 7 is an outline view showing a brake device according to a third illustrative embodiment of the present invention.
Figure 8:
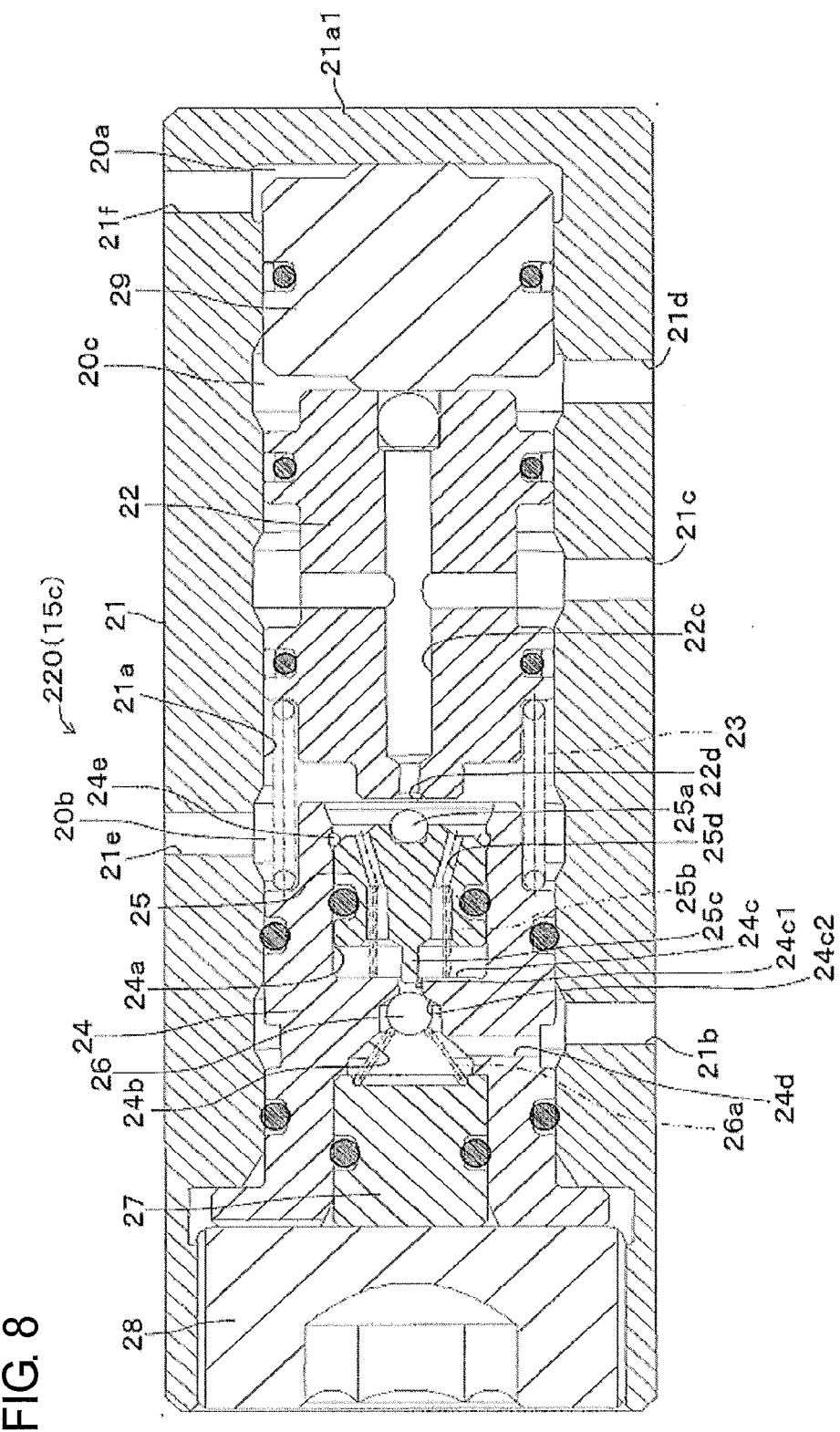
FIG. 8 is a sectional view showing a regulator shown in FIG. 7.

Next, the brake device according to a third illustrative embodiment of the present invention is described with reference to FIGS. 7 and 8. FIG. 7 is an outline view showing a configuration of the brake device B, and FIG. 8 is a sectional view showing a regulator 220. The third illustrative embodiment is different from the second illustrative embodiment, in that the pilot fluid pressures to be supplied to the two neighboring pilot fluid pressure chambers 20a, 20c are configured to be opposite to the second illustrative embodiment. The same configurations are indicated with the same reference numerals and the descriptions thereof are omitted.

Specifically, the pilot fluid pressure chamber 20a (first pilot fluid pressure chamber) formed between the second pressure regulating piston 29 and the bottom wall 21a1 communicates with the pilot pressure input port 21f. In addition, the second pilot fluid pressure chamber 20c formed between the second pressure regulating piston 29 and the first pressure regulating piston 22 communicates with the pilot pressure input port 21d.

In other words, the second pilot fluid pressure chamber 20c is connected with the reservoir tank 14 (low-pressure source) through the pilot pressure input port 21d and the pressure reduction control valve 15b1 and with the accumulator 15a1 (high-pressure source) through the pressure boost control valve 15b2. The pilot fluid pressures, which are generated as the pressure reduction control valve 15b1 and the pressure boost control valve 15b2 are operated, are applied to the pilot pressure input port 21d (second pilot fluid pressure chamber 21c).

In the meantime, the first pilot fluid pressure chamber 20a is connected with the stroke simulator part 12, which is a mechanical pilot pressure generating part that generates the pilot fluid pressure corresponding to the operating amount to the brake pedal 11, through the pilot pressure input port 21f different from the pilot pressure input port 21d. The pilot fluid pressure that is generated in the stroke simulator part 12 is applied to the pilot pressure input port 21f (first pilot fluid pressure chamber 20a).

In this case, when the pressure reduction control valve 15b1 and the pressure boost control valve 15b2 are operated without the failure of the electric system and the like, the fluid pressure that is supplied from the pressure reduction control valve 15b1 and the pressure boost control valve 15b2 is basically set to have a pressure value higher than the fluid pressure that is supplied from the stroke simulator part 12 to the pilot pressure input port 21f. At this time, accordingly, it is possible to operate the regulator 15c by operating only the first pressure regulating piston 22 without the operating (moving) the second pressure regulating piston 29. In the meantime, when the electric system fails, it is possible to operate the regulator 15c by operating the second and first pressure regulating pistons 29, 22 only with the fluid pressure that is supplied from the stroke simulator part 12 to the pilot pressure input port 21f.

(4) Fourth Illustrative Embodiment

Figure 9:
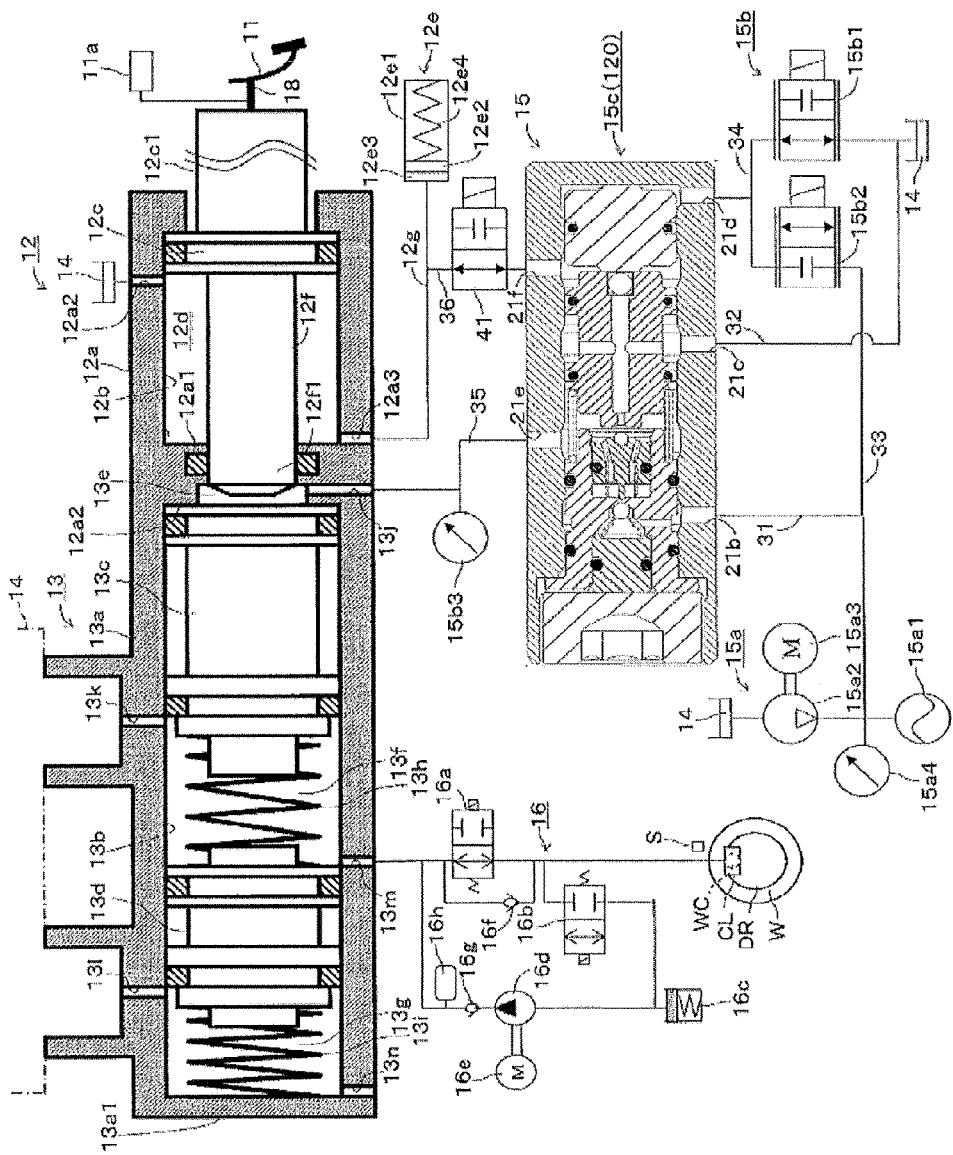
FIG. 9 is an outline view showing a brake device according to a fourth illustrative embodiment of the present invention.

Next, the brake device according to a fourth illustrative embodiment of the present invention is described with reference to FIG. 9. FIG. 9 is an outline view showing a configuration of the brake device B. The fourth illustrative embodiment is different from the second illustrative embodiment, in that a pilot pressure control valve 41 is provided. The same configurations are indicated with the same reference numerals and the descriptions thereof are omitted.

Specifically, the pilot pressure control valve 41 is a solenoid control valve of a normally open type that is provided on fluid pressure oil passage 36 and controls the flow of the brake fluid between the stroke simulator part 12 (mechanical pilot pressure generating part) and the pilot pressure input port 21*f*. The pilot pressure control valve 41 is opened and closed based on the command from the brake ECU 17.

The operations of the fourth illustrative embodiment will be described. When the electric system fails, the pilot pressure control valve 41 of a normally open type is opened and the fluid pressure chamber 12*d* of the stroke simulator part 12 and the pilot pressure input port 21*f* communicate with each other. At this time, similarly to the second illustrative embodiment, insofar as the high pressure is supplied from the accumulator 15*a*1, the regulator 15*c* (mechanical pressure regulating part) outputs the fluid pressure corresponding to the pressure applied to the pilot pressure input port 21*f* from the output port 21*e* by the fluid pressures applied to both of the high-pressure port 21*b* and the low-pressure port 21*c*.

In addition, the brake ECU 17 (control unit) closes the pilot pressure control valve 41 when regeneration is requested at the state where the failure of the electric system does not occur. Since the pilot pressure control valve 41 is closed, the pilot pressure input port 21*f* of the regulator 15*c* (mechanical pressure regulating part) is not applied with the output fluid pressure corresponding to the operating amount of the brake operating member of the stroke simulator part 12 (mechanical pilot pressure generating part) and is applied with only the pilot fluid pressure generated by the electrically-operated pilot pressure generating part 15*b*. Thus, it is possible to perform a desired regenerative braking by generating the pilot fluid pressure corresponding to the regeneration request with the electrically-operated pilot pressure generating part 15*b*. In the meantime, as described above, since the regeneration request value is set with respect to the braking request of the driver, i.e., the braking operation state, the brake ECU 17 sets the regeneration request corresponding to the operating amount that is detected based on the pedal stroke sensor 11*a*. Accordingly, the brake ECU 17 serves as a vehicle state detection unit that detects the regeneration request.

In addition, under anti lock brake control at the state where the failure of the electric system does not occur, the brake ECU 17 (control unit) opens the pilot pressure control valve 41. Since the pilot pressure control valve 41 is opened, the pilot pressure input port 21*f* of the regulator 15*c* (mechanical pressure regulating part) is applied with the output fluid pressure of the stroke simulator part 12 and the pilot pressure input port 21*d* is applied with the output fluid pressure of the electrically-operated pilot pressure generating part 15*b*. Thus, even when the brake fluid of high flow rate is necessary for the anti lock brake control, it is possible to sufficiently cope with the situation because it is possible to generate the pilot fluid pressure in good responsiveness by both pilot pressure generating parts of the stroke simulator part 12 and the electrically-operated pilot pressure generating part 15*b*. In the meantime, as described above, the brake ECU 17 performs ABS control (anti lock brake control) of switching the opening and closing of the respective solenoid valves 16*a*, 16*b*, based on the master cylinder pressure, the wheel speed and the longitudinal acceleration, and operating the electric motor 16*e*, as required, to adjust the brake fluid pressure applied to the wheel cylinder WC, i.e., the braking force applied to the wheel W. Accordingly, the brake ECU 17 serves as a vehicle state detection unit that detects the anti lock brake control state.

That is, when the electric system normally operates, the brake ECU 17, which is the control unit, controls the flow of the brake fluid between the stroke simulator part 12 (mechanical pilot pressure generating part) and the pilot pressure input port 21*f* by the pilot pressure control valve 41 in response to the vehicle state that is detected by the brake ECU 17 that is the vehicle state detection unit, thereby appropriately adjusting a ratio of the fluid pressure corresponding to the operating amount of the brake pedal 11, which occupies in the fluid pressure output from the regulator 15*c* (mechanical pressure regulating part), in response to the vehicle state. In the meantime, the vehicle state includes an on-state or off state of an ignition switch. When the ignition switch is on, the control of the pilot pressure control valve resulting from a detection result of the vehicle state includes the control of closing the pilot pressure control valve all the time inasmuch as the failure of the electric system does not occur.

In addition, the pilot pressure control valve 41 is a control valve of a normally open type. Accordingly, even when the electric system fails, it is possible to output the fluid pressure corresponding to the pilot pressure of the stroke simulator part 12 to the output port 21*e*, thereby driving the master piston 13*c*.

Further, in the above illustrative embodiment, the stroke simulator part 12 (mechanical pilot pressure generating part) has the piston 12*c* that is interlockingly operated with the brake pedal 11 (brake operating member), the body 12*a* (cylinder) in which the piston 12*c* slides, the fluid pressure chamber 12*d* that is formed by the piston 12*c* and the cylinder 12*a* and the stroke simulator 12*e* that is connected to the fluid pressure chamber 12*d*, and generates fluid pressure of the fluid pressure chamber 12*d* as the pilot fluid pressure. Thereby, it is possible to appropriately generate the pilot fluid pressure corresponding to the operating amount of the brake pedal 11 with a simple configuration.

(5) Fifth Illustrative Embodiment

Figure 10:
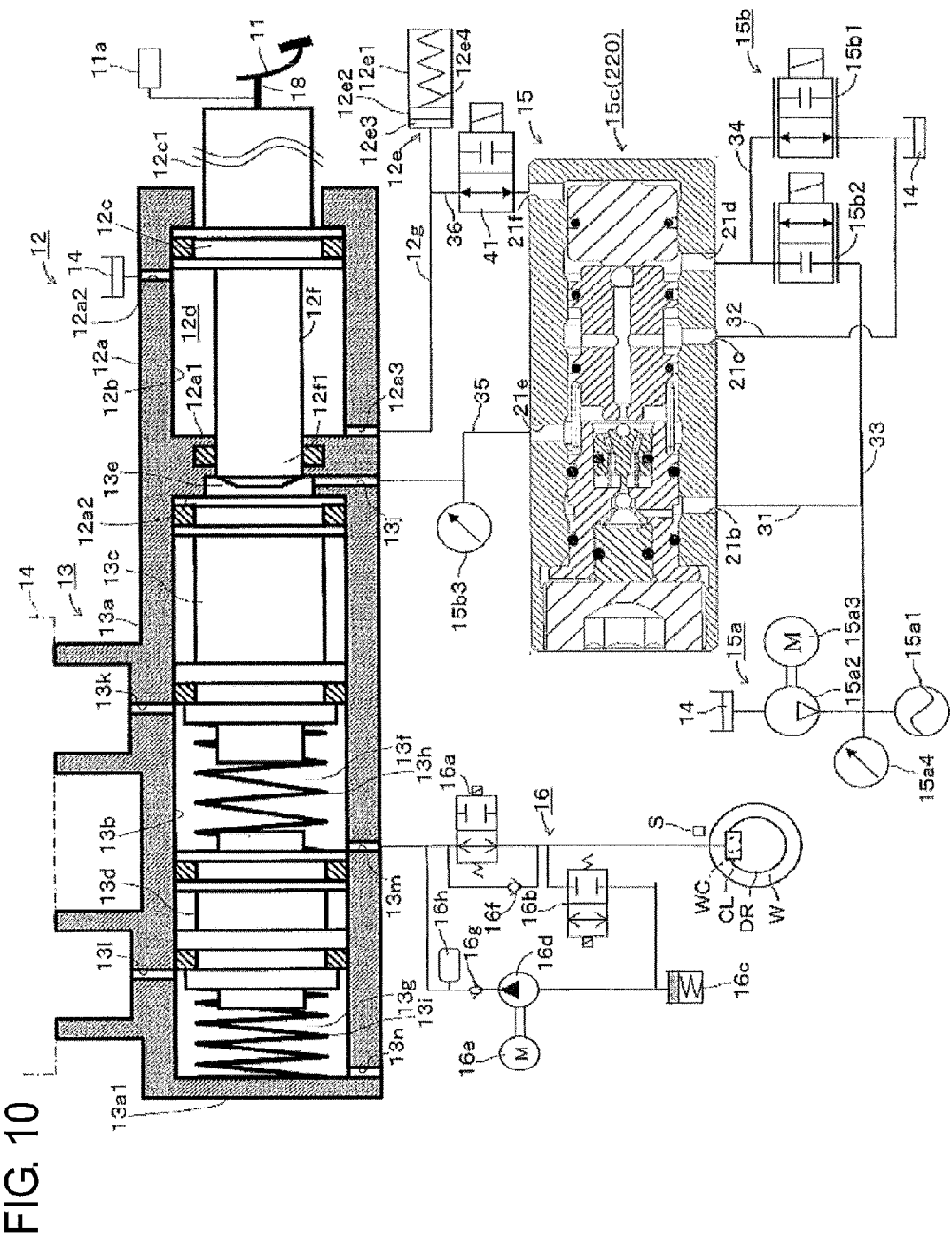
FIG. 10 is an outline view showing a brake device according to a fifth illustrative embodiment of the present invention.

Next, the brake device according to a fifth illustrative embodiment of the present invention is described with reference to FIG. 10. FIG. 10 is an outline view showing a configuration of the brake device B. The fifth illustrative embodiment is different from the third illustrative embodiment, in that the pilot pressure control valve 41 is provided. The same configurations are indicated with the same reference numerals and the descriptions thereof are omitted.

Specifically, the pilot pressure control valve 41 is a solenoid control valve of a normally open type that is provided on the fluid pressure oil passage 36 and controls the flow of the brake fluid between the stroke simulator part 12 (mechanical pilot pressure generating part) and the pilot pressure input port 21*f*. The pilot pressure control valve 41 is opened and closed based on the command from the brake ECU 17.

The operations of the fifth illustrative embodiment are the same as those of the fourth illustrative embodiment. Thus, the descriptions thereof are omitted.

(6) Sixth Illustrative Embodiment

Figure 11:
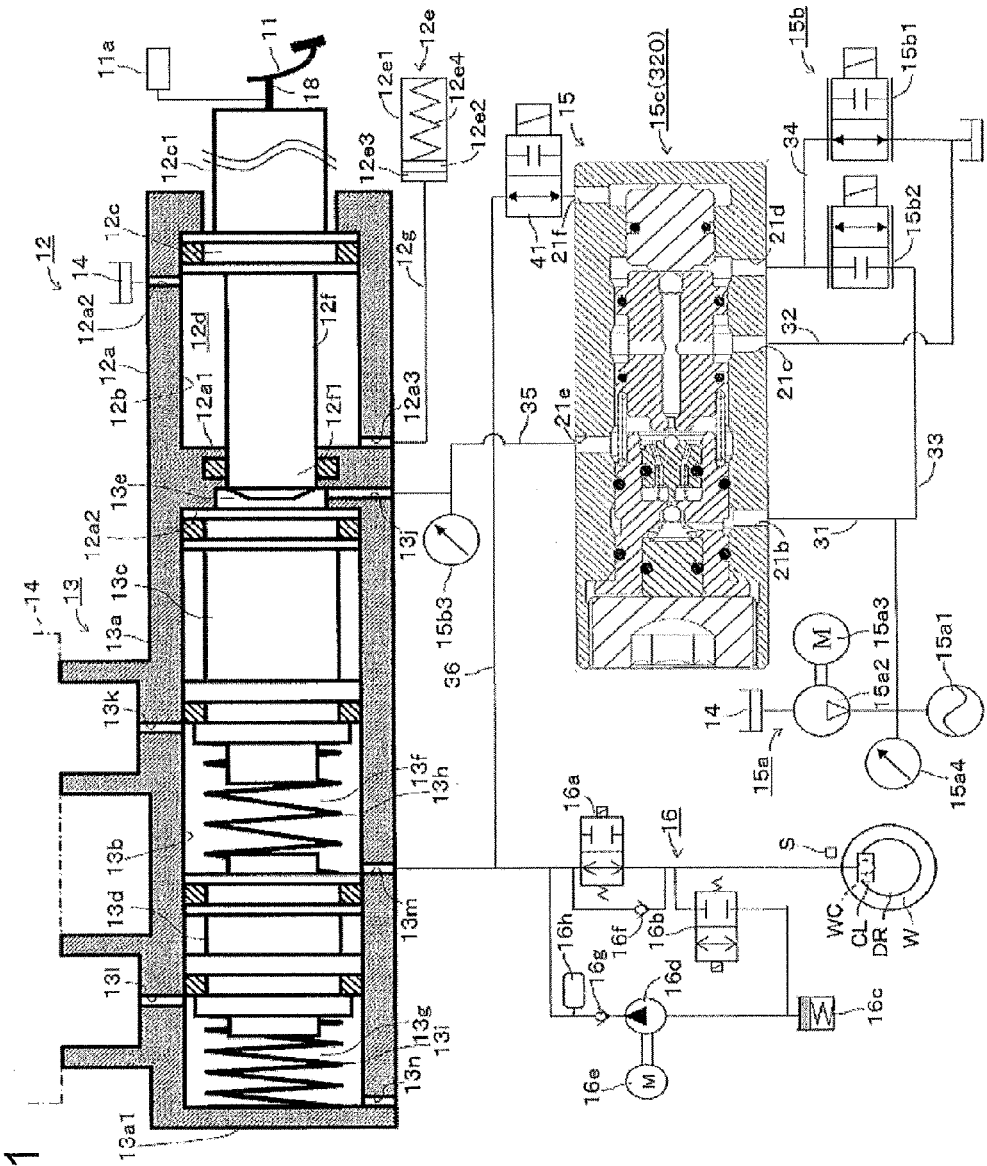
FIG. 11 is an outline view showing a brake device according to a sixth illustrative embodiment of the present invention.
Figure 12:
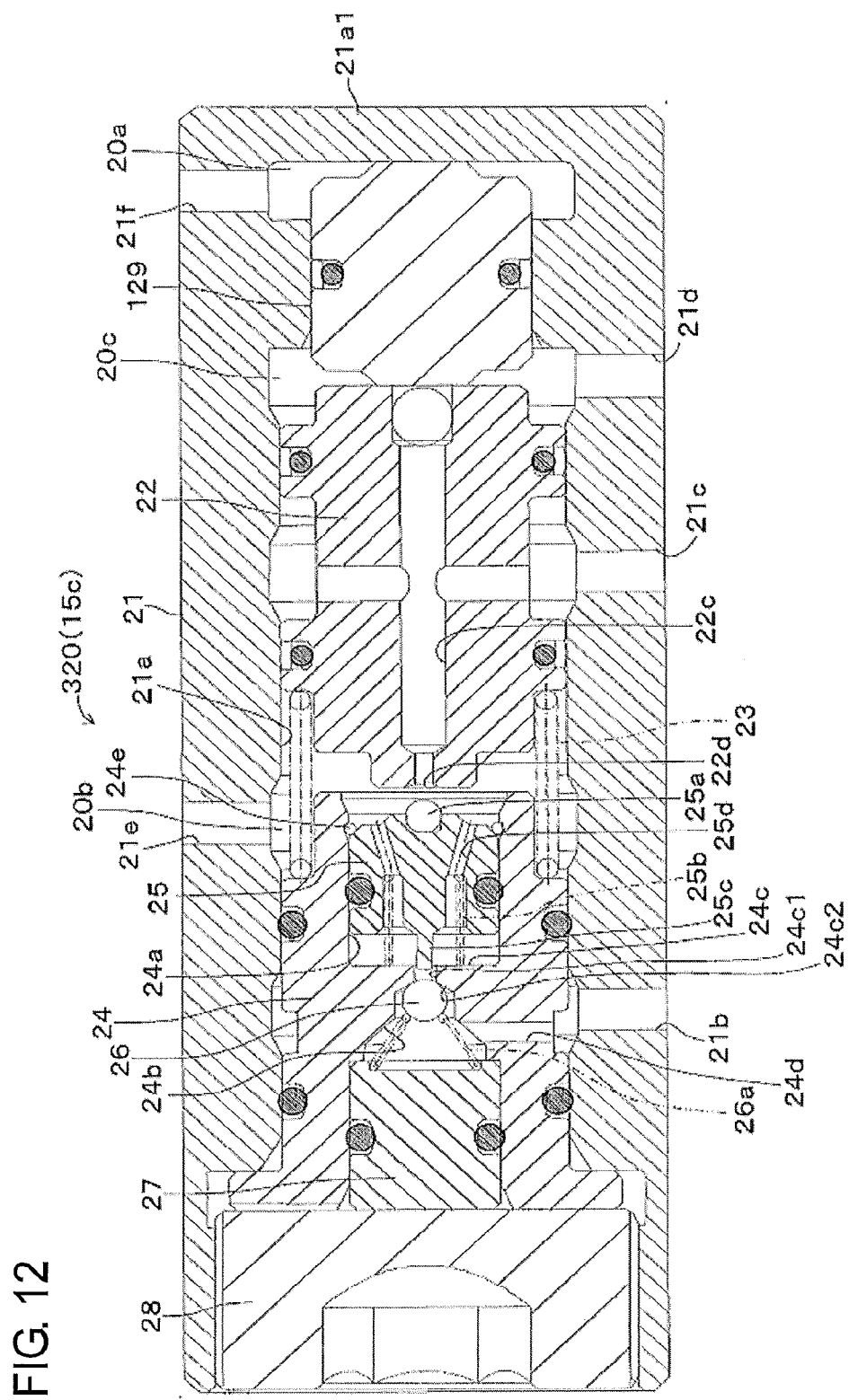
FIG. 12 is a sectional view showing a regulator shown in FIG. 11.

Next, the brake device according to a sixth illustrative embodiment of the present invention is described with reference to FIGS. 11 and 12. FIG. 11 is an outline view showing a configuration of the brake device B, and FIG. 12 is a sectional view showing a regulator 320. The sixth illustrative embodiment is different from the fifth illustrative embodiment, in that the first fluid pressure chamber 13*f* of the master cylinder 13 is adopted as the mechanical pilot pressure generating part. The same configurations are indicated with the same reference numerals and the descriptions thereof are omitted.

Specifically, the mechanical pilot pressure generating part of the sixth illustrative embodiment has the first piston 13c that is a master piston and the master cylinder 13 in which the master piston 13c slides. The fluid pressure of the first fluid pressure chamber 13f, which is a master chamber formed by the master piston 13c and the master cylinder 13, is generated as the pilot fluid pressure. The fluid pressure oil passage 36 connects the pilot pressure input port 21f and the port 13m. Thereby, it is possible to use the configuration of the existing master cylinder without adopting a special configuration for generating the pilot fluid pressure, so that it is possible to make the device small and at low cost. In the meantime, the second fluid pressure chamber 13g of the master cylinder 13 may be adopted as the mechanical pilot pressure generating part. Further, the pilot pressure control valve 41 is provided on the fluid pressure oil passage 36.

In this case, it is preferable to adopt a regulator 320 shown in FIG. 12, as the regulator 15c. The regulator 320 is different from the regulator 220, in that a second pressure regulating piston 129 has a diameter smaller than the second pressure regulating piston 29 of the third illustrative embodiment. The other configurations are the same and are indicated with the same reference numerals and the descriptions thereof are omitted.

In the regulator 320, the fluid pressure of the pilot fluid pressure chamber 20a and the fluid pressure of the first fluid pressure chamber 13f are the same and the fluid pressure of the pressure regulating chamber 20b and the fluid pressure of the driving fluid pressure chamber 13e are the same. In addition, the regulator 320 is configured such that the fluid pressure of the driving fluid pressure chamber 13e influencing the first piston 13c in the left direction of the drawing is smaller than the fluid pressure of the first fluid pressure chamber 13f influencing the first piston 13c in the right direction of the drawing. In the meantime, in this case, the pressure-receiving areas of both end surfaces of the first piston 13c are the substantially same. In addition, even when the pressure-receiving areas of both end surfaces of the first piston 13c are different, the regulator 320 is preferably configured such that the fluid pressure of the driving fluid pressure chamber 13e influencing the first piston 13c in the left direction of the drawing is smaller than the fluid pressure of the first fluid pressure chamber 13f influencing the first piston 13c in the right direction of the drawing.

The operations of the sixth illustrative embodiment will be described. When the pressure boost control valve 15b2 and the pressure reduction control valve 15b1 are under off-state due to the failure of the electric system and the like, the pressure reduction control valve 15b1 of a normally open type is opened and the pressure boost control valve 15b2 of a normally close type is closed at the off-state. Accordingly, the pilot fluid pressure is not supplied to the second pilot fluid pressure chamber 20c. The pilot pressure control valve 41 provided on the fluid pressure oil passage 36 is opened. Thereby, even when the electric motor 15a2 cannot operate under off-state, the pressure from the accumulator 15a1 is supplied to the high-pressure port 21b and the pressure from the reservoir tank 14 (low-pressure source) is supplied to the low-pressure port 21, insofar as the high pressure remains in the accumulator 15a1.

When the brake pedal 11 (brake operating member) is operated, the rod 12f directly presses the first piston 13c, before the regulator 15c starts to supply the regulator pressure, so that the master cylinder pressure is formed in the first fluid pressure chamber 13f. When the master cylinder pressure is supplied from the first fluid pressure chamber 13f, the master cylinder pressure (pilot fluid pressure) corresponding to the operating amount of the brake pedal 11 is input to the pilot pressure input port 21f. Therefore, the regulator 15c outputs the fluid pressure (regulator pressure) corresponding to the master cylinder pressure from the output port 21e. Thus, inasmuch as the high pressure is supplied from the accumulator 15a1, the regulator 15c can supply the fluid pressure having a regulated pressure to the driving fluid pressure chamber 13e and can suppress the lowering of the braking force.

In the meantime, when failure of the electric system does not occur and the electric motor 15a2, the pressure boost control valve 15b2 and the pressure reduction control valve 15b1 normally operate, the master cylinder pressure (pilot fluid pressure) corresponding to the operating amount of the brake pedal 11 is input to the pilot pressure input port 21d by the operations of the pressure boost control valve 15b2 and the pressure reduction control valve 15b1, before the regulator 15c starts to supply the regulator pressure. In addition, since the regulator 15c operates as described above, it is possible to perform the pressure regulation by the regulator 15c and the pressure regulation by the operations of the pressure boost control valve 15b2 and the pressure reduction control valve 15b1.

In the sixth illustrative embodiment, the pilot pressure control valve 41 may be omitted and the pilot fluid pressures that are input to the pilot pressure input ports 20a, 20c may be the same as the fourth illustrative embodiment.

In the respective illustrative embodiments, it has been described that the invention is applied to the brake device mounted on the hybrid vehicle. However, the present invention may be applied to a brake device of a vehicle to which only an engine is mounted.

In addition, the present invention can be applied to a brake device capable of performing ESC control as well as the brake device capable of performing the ABS control. The brake device capable of performing ESC control has such a configuration that a differential pressure control valve is provided between the master cylinder 13 and the braking fluid pressure regulating device 16 in the first illustrative embodiment.

In the respective illustrative embodiments, regarding the regulator 15c, the other configuration may be adopted insofar as it is a mechanical pressure regulating part.

In the respective illustrative embodiments, the spring may be replaced with the other press member (for example, press member made of rubber) inasmuch as the press member can press.

What is claimed is:
1. A brake device comprising:
a mechanical pressure regulating part including:
  a high-pressure port, to which fluid pressure of high pressure is supplied;
  a low-pressure port, to which fluid pressure of lower pressure than the fluid pressure to be supplied to the high-pressure port is supplied;
  a first pilot pressure input port to which pilot fluid pressure is supplied, and a second pilot pressure input port to which pilot fluid pressure is supplied; and
  an output port which outputs fluid pressure corresponding to the pressure supplied to the first pilot pressure input port by the fluid pressures supplied to both of the high-pressure port and the low-pressure port, to a driving fluid pressure chamber which drives a master piston;

a high-pressure source which is connected to the high-pressure port and the first pilot pressure input port, and which accumulates fluid pressure of a brake fluid pumped by an electric pump;

a low pressure source which is connected to the low-pressure port and the first pilot pressure input port, and which supplies lower pressure than the high-pressure source;

an electrically-operated pilot pressure generating part which includes a pressure boost control valve for controlling flow of the brake fluid between the high-pressure source and the first pilot pressure input port, and a pressure reduction control valve for controlling flow of the brake fluid between the low-pressure source and the first pilot pressure input port, and which outputs desired pilot fluid pressure to the pilot pressure input port by controlling the flow of the brake fluid with the pressure boost control valve and the pressure reduction control valve;

wherein the mechanical pressure regulating part outputs fluid pressure corresponding to a highest fluid pressure among the fluid pressures supplied to the first and second pilot pressure input ports, to the output port;

wherein the pressure boost control valve is a control valve of a normally close type;

wherein the pressure reduction control valve is a control valve of a normally open type;

a mechanical pilot pressure generating part which is connected to the second pilot pressure input port, and which generates the pilot fluid pressure corresponding to an operating amount of a brake operating member;

wherein the mechanical pilot pressure generating part includes:

a master cylinder;

the master piston which slides in the master cylinder; and a master chamber formed by the master piston and the master cylinder; and wherein the mechanical pilot pressure generating part is configured to generate fluid pressure of the master chamber as pilot fluid pressure to the second pilot pressure port.

2. The brake device according to claim 1, wherein the master cylinder is configured such that a correlation between an operation to the brake operating member and fluid pressure of the master chamber is separable.

3. The brake device according to claim 1, wherein the master cylinder is configured such that when the electrically-operated pilot pressure generating part normally operates, fluid pressure of the master chamber becomes smaller than fluid pressure output from the electrically-operated pilot pressure generating part.

* * * * *